United States Patent [19]
Kudeljan et al.

[11] 3,932,766
[45] Jan. 13, 1976

[54] CONTROL SYSTEM FOR AN EXTERNALLY CONTROLLED CONVERTER

[75] Inventors: Damir Kudeljan, Montreal, Canada; Klaus Rambold, Erlangen, Germany

[73] Assignee: Siemens Aktiengesellschaft, Munich, Germany

[22] Filed: July 23, 1973

[21] Appl. No.: 381,543

[30] Foreign Application Priority Data
July 24, 1972 Germany............................ 2236222

[52] U.S. Cl............ 307/229; 307/254; 307/252 UA
[51] Int. Cl.² ........................................ H03K 17/00
[58] Field of Search ..... 307/252 UA, 252 B, 252 N, 307/252 H, 127, 147, 228, 229, 230; 323/22; 328/28

[56] References Cited
UNITED STATES PATENTS

| | | | |
|---|---|---|---|
| 3,363,143 | 1/1968 | Cavanaugh | 323/22 |
| 3,365,654 | 1/1968 | Johnston | 323/22 |
| 3,419,784 | 12/1968 | Winn | 328/127 |
| 3,506,852 | 4/1970 | Hart | 307/252 UA |
| 3,764,890 | 10/1973 | Caen | 307/252 UA |

Primary Examiner—John S. Heyman
Assistant Examiner—B. P. Davis
Attorney, Agent, or Firm—Kenyon & Kenyon Reilly Carr & Chapin

[57] ABSTRACT

An improved control system for providing firing pulses to an externally controlled converter in which the firing pulses are formed by comparing a comparison voltage which is proportional to the voltage time area of the synchronizing voltage with a variable DC control voltage to thereby decrease the sensitivity of the control system to frequency changes, harmonics on the line voltage and commutation interference.

8 Claims, 12 Drawing Figures

CONTROL SYSTEM FOR AN EXTERNALLY CONTROLLED CONVERTER

BACKGROUND OF THE INVENTION

This invention relates to control systems for externally controlled converters in general and more particularly to an improved control system which has less sensitivity to variations in line frequency, harmonics in the line voltage and commutation interference.

Various control systems for such externally controlled converters have been previously developed for example see German Auslegeschrift No. 1,021,025 or a handbook by G. Moeltgen entitled "Line Controlled Converters with Thyristors", edited and published by Siemens AG 1967 pages 275 and 280. These previous systems have triggered on the zero crossing of a synchronization voltage which is typically the line voltage. This voltage however can sometime shift several degrees if harmonics are present. Sometimes because of harmonics or other interferences, a plurality of zero crossings can occur successively. Such can occur, for example, if other converters are coupled to the same line when their respective commutation occurs. Thus, under certain conditions the prior art control systems do not perform in a satisfactory manner, particularly when they are used for controlling thyristors in positioning control circuits and are connected to a synchronizing voltage which has a variable frequency and heavy distortion of the line voltage wave shape. In attempts to overcome these problems filters made up of resistors and capacitors or inductors and capacitors have been used. However these filters are considerably expensive and do not work in a completely adequate manner. In particular such a solution is not effective where the frequency of the synchronization voltage changes. Thus there is a need for an improved control system for externally controlled converters which is less sensitive to the above described effects of frequency variation, harmonics and interference from other converters.

SUMMARY OF THE INVENTION

The present invention provides a control system which is less sensitive to the type of disturbances noted above. The circuit of the present invention integrates the synchronization voltage to develop a comparison voltage representing the voltage time area of the synchronization voltage which is then compared with a variable DC voltage to generate the firing pulses. Through the use of the integrator the system is insensitive to frequency changes, harmonics of the synchronizing voltage and to commutation interference. This permits it to operate satisfactorily with distorted synchronizing voltages. When used to control an AC control element, good symmetry of the voltage time areas produced are obtained which are independent of frequency changes and of heavy distortion of the line voltages. Systems in which assymetry does not exceed plus or minus 0.5 percent of the voltage time area of the line voltage can be achieved without difficult.

In the perferred embodiments two comparators are provided. The output of the integrator is connected through a decoupling capacitor and a limiting stage to each of the comparators which have as their respective inputs a DC control voltage; one being fed the control voltage directly and the other being fed the control voltage after inversion. The respective comparators will each provide an output as the integrator output (which is in the form of a sign wave) crosses their DC control voltage. One comparator outputs a pulse when this voltage is crossed in the positive direction and the other when it is crossed in the negative direction. In addition, the system includes a circuit which determines the polarity of the synchronization voltage and provides pulses indicative thereof. These pulses are combined with the comparator outputs and then provided, through appropriate pulse amplifiers, as the firing pulses for the thyristors in the converter. This assures that control pulses are provided only to the thyristors which have a positive voltage applied thereto.

A number of embodiments having improved circuits which include additional logic and memory elements and which increases the ability of the system to operate satisfactorily in the present of disturbances are shown.

DETAILED DESCRIPTION OF THE PREFERRED EMBODIMENT

Figure 1:
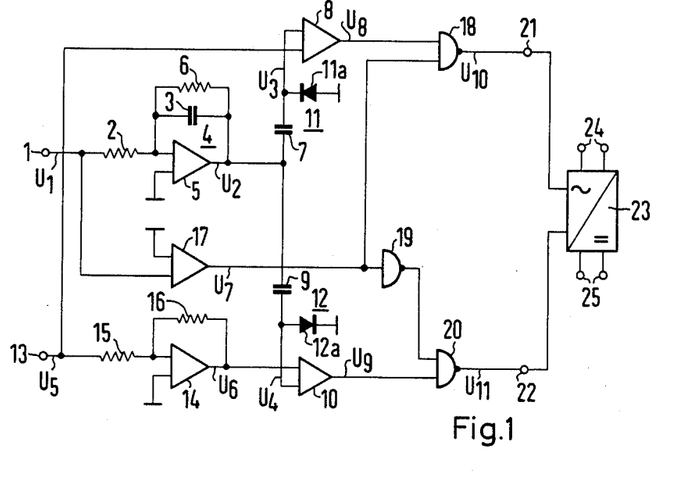
FIG. 1 is a schematic diagram of a first embodiment of the invention.

The first and simplest embodiment of the present invention is shown on FIG. 1. A synchronizing voltages $U_1$ is provided into input terminal 1 of the circuit. This will normally be the sinusoidal line voltage as illustrated by the voltage wave-form $U_1$ on FIG. 5. It is provided through a resistor 2 to an operational amplifier 5 having a capacitor 3 in its feedback path to cause it to operate as an integrator 4. The output of integrator 4 will be a voltage $U_2$ as shown on FIG. 5. As is evident thereon, at the beginning of the wave-form, the input voltage $U_1$ has just finished its negative cycle which after inversion in amplifier 5 resulted in an output therefrom which is a maximum in the positive direction. Now with the increasing voltage $U_1$ the integrator 4 begins to integrate toward zero, crossing zero approximately at the peak of the wave-form $U_1$. Integration continues in a negative direction reaching a neagtive peak as the wave-form $U_1$ crosses zero. Now with a negative input voltage on $U_1$ an integration in the other direction commenses with the output voltage decreasing until it crosses zero at approximately the peak of the input wave-form and then increases to a maximum in the positive direction. This cycle then repeats in well known fashion. Since the output voltage $U_2$ is the integral of the input voltage $U_1$ it is proportional to the voltage - time area of the input voltage. Any unsymmetry in the input wave-form and the input offset voltage can result in a DC voltage component at the integrator output. To overcome the effect of the input offset voltage, a resistor 6 with a fairly large resistance value is shunted across the capcitor as negative feedback for the amplifier 5. Through the use of resistor 6 the residual area of the input offset voltage will be negligible. The output of integrator 4 is provided through a capacitor 7 to one input of a comparator 8. Similarly it is provided through a decoupling capacitor 9 to a comparator 10. The value of capacitors 7 and 9 preferably should be equal. Each of the capacitors has at its output a limiting diode with a limiting diode 11a being provided at the output of capacitor 7 and a limiting diode 12a at the output of capacitor 9. These are indicated generally as limiting stages 11 and 12 respectively. Diode 11a is biased such that it will permit the full positive peak voltage to reach the comparator 8 but will limit any negative portion of the voltage. Similarly diode 12a limits the positive voltage and permits the full negative peak to be provided to comparator 10. Each of the voltage $U_3$ and $U_4$ is arranged so that its respective negative or positive peak nominally occurs at the limiting voltage. Thus the comparison voltage $U_3$ input to comparator 8 will always be positive and the voltage $U_4$ to comparator 9 always negative. Although shown as limiting these voltages at zero volts using diodes, limiting at other voltages is also possible.

The second input to the controller is a variable DC voltage provided as an input teminal 13. In conventional fashion, this DC voltage can be varied to select the point on the synchronizing wave-form at which the thyristors are fired. This DC voltage is provided directly to the comparator 8 and through an inverter comprising amplifier 14, input resistor 15 and feedback resistor 16 to the second input of comparator 10. The resistors 15 and 16 will be chosen to be equal to obtain unity gain with inversion through the amplifier 14. Preferably the resistors 15 and 16 should have a tolerance of plus or minus 0.1 percent. The output $U_8$ of comparator 8 will remain at zero until the voltage $U_3$ falls below the reference voltage $U_5$ from terminal 13. Similarly the output of comparator 10 will remain at 0 until the negative portion of the voltage $U_2$ at the comparator input $U_4$ rises above the inverted reference voltage $U_6$ at the second comparator or input. The various voltages are shown on FIG. 5. Thus it can be seen that as the positive voltage $U_3$ falls below the reference voltage $U_5$ the output $U_8$ goes from a zero value to a positive voltage value. It remains at this value until the value of $U_3$ again exceeds the value of $U_5$ which point it returns to zero. Similarly when $U_4$ becomes more positive than $U_6$ the output voltage $U_9$ goes from zero to a positive voltage. When $U_4$ voltage becomes more negative than $U_6$ the voltage $U_9$ again goes to zero. Thus, the rising and falling edges of the voltages pulses $U_8$ and $U_9$ correspond with the points of intersection of their respective comparison and DC reference voltages.

The synchronization voltage at terminal 1 is also provided to an amplifier 17 which is adapted to provide a positive output voltage whenever the input voltage is positive and a 0 output voltage when the input voltage is negative. This output $U_7$ is provided to a Nand gate 18 which has as its second input the output of comparator 8. The output $U_7$ is also provided through a Nand gate inverter 19 to a Nand gate 20 having as a second input the output of comparator 10. Thus, gate 18 will have a positive voltage input during the positive half of the cycle of the voltage $U_1$ and, because of the inversion, Nand gate 20 will have a positive voltage input during the negative half of the cycle. The truth tables of the Nand gates 18 and 20 are as follows:

| NAND Gate 18 | | | NAND Gate 20 | | |
|---|---|---|---|---|---|
| $U_7$ | $U_8$ | $U_{10}$ | $U_7$ | $U_9$ | $U_{11}$ |
| 0 | 0 | 1 | 0 | 0 | 1 |
| 0 | 1 | 1 | 0 | 1 | 1 |
| 1 | 0 | 1 | 1 | 0 | 1 |
| 1 | 1 | 0 | 1 | 1 | 0 |

Figure 5:
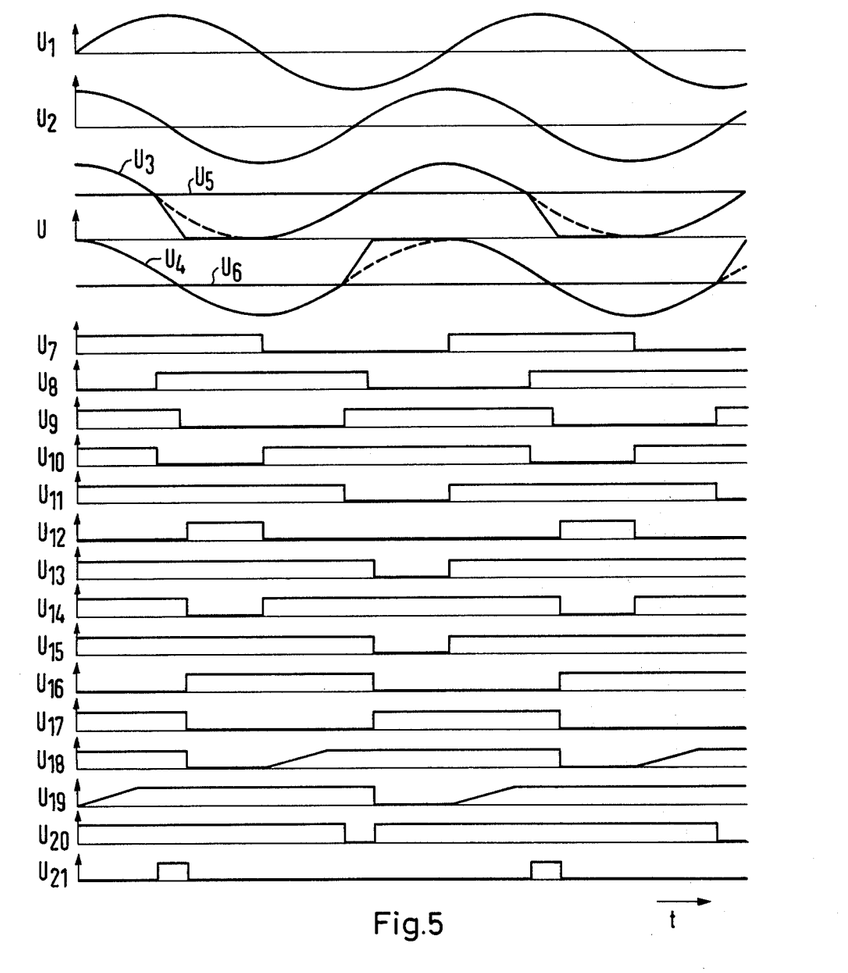
FIG. 5 is a wave-form diagram illustrating the voltages at various portions of the circuits of FIGS. 1 through 4.

These output voltages designated $U_{10}$ and $U_{11}$ respectively are also shown on FIG. 5. The pulses obtained on wave forms $U_{10}$ and $U_{11}$ can then be used as the firing pulses for the control thryristors after being amplified in pulse or chopper amplifiers. As shown on the illustrated embodiment, these pulses are provided respectively to terminals 21 and 22 of a converter [rectifier] 23 having input terminals 24 which are supplied with AC voltage and providing a DC output at terminals 25. In the illustrated embodiment, only a single phase is provided to the converter 23. For three phase operation, the circuit shown on FIG. 1 would be tripled with the respective phase voltages being provided as inputs to the terminals 1 of the three circuits.

Figure 2:
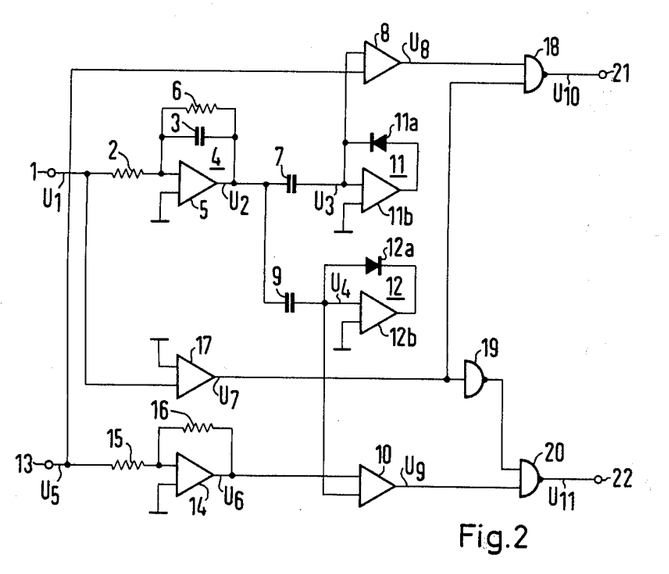
FIG. 2 is a schematic diagram of a second embodiment with a different type of limiter circuit.

FIG. 2 is a schematic diagram of an improved embodiment of the system according to FIG. 1. The primary difference in the system of FIG. 2 is in the type of limiter stages 11 and 12 which are provided. As shown thereon, operational amplifiers 11b and 12b respectively having diodes 11d and 12d in their feed-back paths in the appropriate direction are used herein. The use of the amplifiers 11b and 12b results in overcoming the threshold value of the diodes with the limiting stage now cutting off the voltages $U_3$ and $U_4$ exactly at 0.

Figure 3:
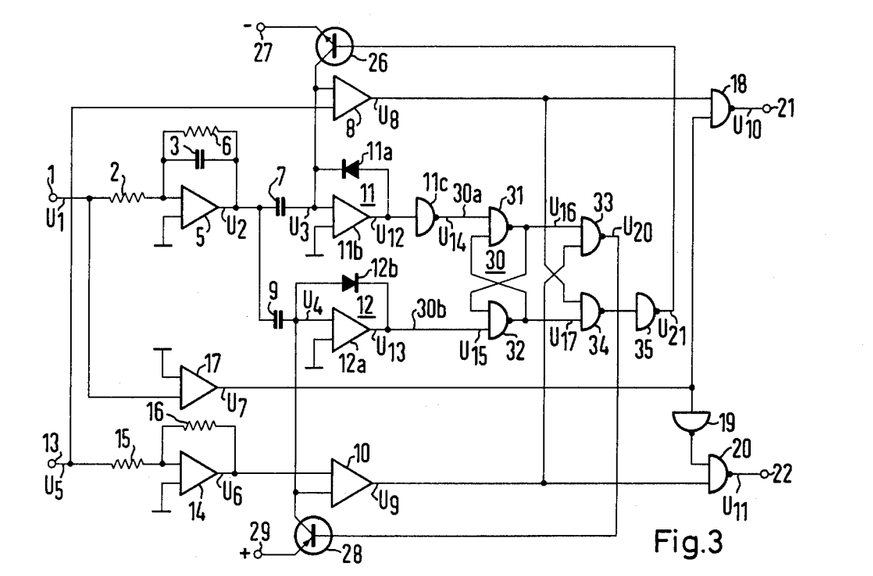
FIG. 3 is a third embodiment of the invention wherein additional logic circuits including memory circuits are provided.

A further embodiment of the invention is illustrated by FIG. 3. In the embodiment of FIG. 3 additional logic circuits which increase the ability of the system to withstand interference at its input are included. A switch 26 having a negative voltage at its input is coupled to the one input of the comparator 8. Similarly a switch 28 is coupled to the one input of the comparator 10. Switch 28 however, obtains a positive voltage from a terminal 29. As shown, the switches will preferably be transistor switches controlled in a manner to be described below. Switch 26 is an NPN transistor having its emitter connected to the terminal 27 and its collector to the comparator 8 input. Switch 28 is a PNP having its emitter coupled to a positive voltage at terminal 29 and its collector to comparator 10. The use of the transistor switches 26 and 28 assured that once the respective comparator voltages $U_8$ and $U_9$ has gone from a zero level to a positive voltage level in response to its input $U_3$ or $U_4$ crossing the DC reference voltage, any disturbances on the line will not cause it to go back to zero. For example, if on FIG. 5 at the point where $U_3$ crosses $U_5$ a disturbance or two occur causing a number of crossings at that point, with nothing further, the comparator 8 would respond to these oscillations and output a series of pulses which would be transmitted through the gate 18 to the thyristor firing circuits. The logic circuits to now be described in effect cause the comparators to be latched once they change state avoiding problems of this nature. The logic circuits driving the transistors 26 and 27 include a flip flop 30 made up of two Nand gates 31 and 32 cross coupled in conventional fashion. The set input of the flip flop designated by line 30a is obtained from the amplifier 11b after being inverted through a Nand gate inverter 11c. The reset input of the flip flop 30 designated 30b is obtained directly from the amplifier 12d. The output of the flip flop 30 designated $U_{16}$ is provided to a Nand gate 32 and the other output designated $U_{17}$ to a Nand gate 34. Nand gate 33 has as its second input the output of comparator 10 and Nand gate 34 as its second input the output of comparator 8. The output $U_{20}$ of Nand gate 33 is provided to the base of transistor 28. The output of Nand gate 34, after inversion through a Nand gate inverter 35 and designated $U_{21}$, is provided to the base of transistor 26.

Operation of the circuit can best be understood by following through an example with reference to the wave-form diagram of FIG. 5. As the voltage $U_3$ which is one input to comparator 8 reaches the level of the DC voltage $U_5$, the comparator output $U_8$ will go from a zero level (or logic "0") to a positive voltage level [also designated herein as a logic "1"]. Flip-flop 30 will be in a condition where it is providing a logic 1 at its output $U_{17}$. With a second 1 being provided into Nand gate 34 when the output of comparator 8 changes, its output will go to a 0 and this 0 will be inverted through Nand gate 35 to result in a $U_{21}$ signal of a 1. This will turn on transistor 26 and cause the input to comparator 8 to be driven toward zero as shown by the solid line on waveform $U_3$ of FIG. 5. The 1 output of comparator 8 is being fed back through the gate 34 and 35 and transistor 26 to hold it in this state. Because of this, should the voltage $U_3$ oscillate and go above the voltage $U_5$ again no effect will be felt at the comparator 8 as long as the transistor 26 remains on. The voltage $U_3$ while still positive will cause at the output of amplifier 11b, after inversion therethrough, a negative voltage. This results in gate 11c providing an output at a logic 1 level on line 30a into the flip flop 30. However, when the voltage $U_3$ drops down to the limit of zero and begins to go negative, the amplifier 11b will have a positive output which is fed back to clamp the voltage at ground, as described above, holding it there. This positive voltage into gate 11c will result in a 0 output which will cause the flip flop 30 to be set in turn causing the voltage $U_{17}$ to go to 0 and the voltage $U_{16}$ to go to a 1. Transistor 26 will be turned off but comparator $U_8$ will continue to have a 1 output because of the clamped voltage $U_3$ which is held at zero.

As the synchronizing voltage $U_2$ increases the voltage $U_4$ at the input of comparator 10 will increase above the DC level $U_6$ causing the comparator 10 output to go from a 0 to a logic 1 level. This output is provided as the second output to the Nand gate 33 which has as its other input the voltage $U_{16}$ from flip flop 30 which as just described is now at a 1 level. Thus, the output $U_{20}$ of Nand gate 33 will go to 0 turning on transistor 28. In the manner described above in connection with comparator 8, the positive voltage into comparator 10 will cause it to be driven toward zero and its output to remain at a logic 1 despite variations in the voltages $U_2$ and $U_4$. When the voltage $U_4$ reaches the point where it is limited by the limiting stage 12, the output of amplifier 12d will go from being positive to a negative voltage which in turn will cause the flip flop 30 to be reset with the output $U_{17}$ a 1 and the output $U_{16}$ a 0. The flip flop is now ready for the next output from the comparator 8. Thus, this circuit assures that any interference which occurs in the area where the voltages $U_3$ or $U_4$ respectively are crossing the reference voltages $U_5$ or $U_6$ will not effect the operation of the circuit. The truth tables of gates 33, 34 and 35 and flip flop 30 are as follows:

| Flip Flop 30 | | | |
|---|---|---|---|
| $U_{14}$ | $U_{15}$ | $U_{16}$ | $U_{17}$ |
| 0 | 1 | 1 | 0 |
| 1 | 1 | no change | |
| 1 | 0 | 0 | 1 |
| 0 | 0 | no change | |

| NAND Gate 34 with Inverter Stage 35 | | | NAND Gate 33 | | |
|---|---|---|---|---|---|
| $U_8$ | $U_{17}$ | $U_{21}$ | $U_9$ | $U_{16}$ | $U_{20}$ |
| 0 | 0 | 0 | 0 | 0 | 1 |
| 0 | 1 | 0 | 0 | 1 | 1 |
| 1 | 0 | 0 | 1 | 0 | 1 |
| 1 | 1 | 1 | 1 | 1 | 0 |

Figure 4:
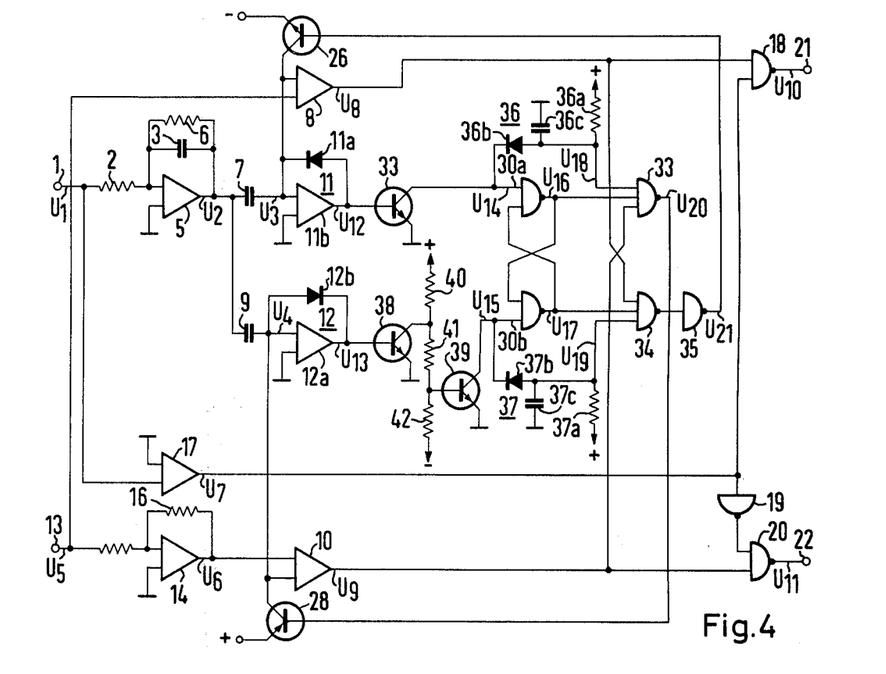
FIG. 4 is a further embodiment similar to that of FIG. 3 which includes additional circuit elements.

A further improved circuit is illustrated by FIG. 4. This embodiment avoids the inadvertent turning off of transistors due to disturbances from commutation or the like which can cause collapse and even a reversal of polarity on the synchronizing voltage. To avoid the effects of such disturbances time delays 36 and 37 are included in this embodiment.

The output of amplifier 11b is connected to the base of a transistor 33, having its emitter grounded and its collector connected as an input to the input 30a of the flip flop 30. Gate 33 has a third input, designated as the voltage $U_{18}$, obtained from a resistor having its other side connected to a positive voltage. The gate input is also connected through a diode 36b to the input of 30c of the flip flop. A capacitor 36c is provided from the junction of resistor 36a and diode 36b to ground. If the output of amplifier 11b momentarily goes to a positive voltage, it will turn on the transistor 33 effectively shorting it out to ground. Normally this would set the flip flop 30. However, the voltage on capacitor 36c will prevent the flip flop from immediately being set as it slowly discharges through the transistor 33. Thus, if the interruption is only momentary, the input 30a will remain at a logic 1 as will the input to gate $U_{18}$ to gate 33 and the flip flop will not be set. Thus, the voltage $U_{17}$ will remain at a logic 1 and transistor 26 will remain turned on keeping the comparator 8 at logic 1. A subsequent voltage $U_3$ which goes above the voltage $U_5$ will then have no effect on the comparator 8 which remains in a locked condition. The delay 37 is constructed in similar fashion using a resistor 37a, a diode 37b and a capacitor 37c. Here however, a pair of transistors 38 and 39 are required since the output $U_{13}$ is not inverted at the input 30b to the flip flop. Thus two transistors to perform a double inversion are required. Transistors 38 and 39 are coupled through conventional load and biasing resistors 40, 41 and 42. Operation is similar to that described above with the capacitor 37 discharging through the transistor 39 to prevent resetting of the flip flop improperly. Thus brief interruptions of the voltages which cause the outputs of the amplifiers 11b and 12a in the limiters to change state improperly will not effect the operation of the transistors 26 and 28 and the outputs of the comparators 8 and 10 will not be affected. Through a circuit of this nature, the effects of commutation interruptions of durations up to 1 millisecond can be handled.

Figure 6:
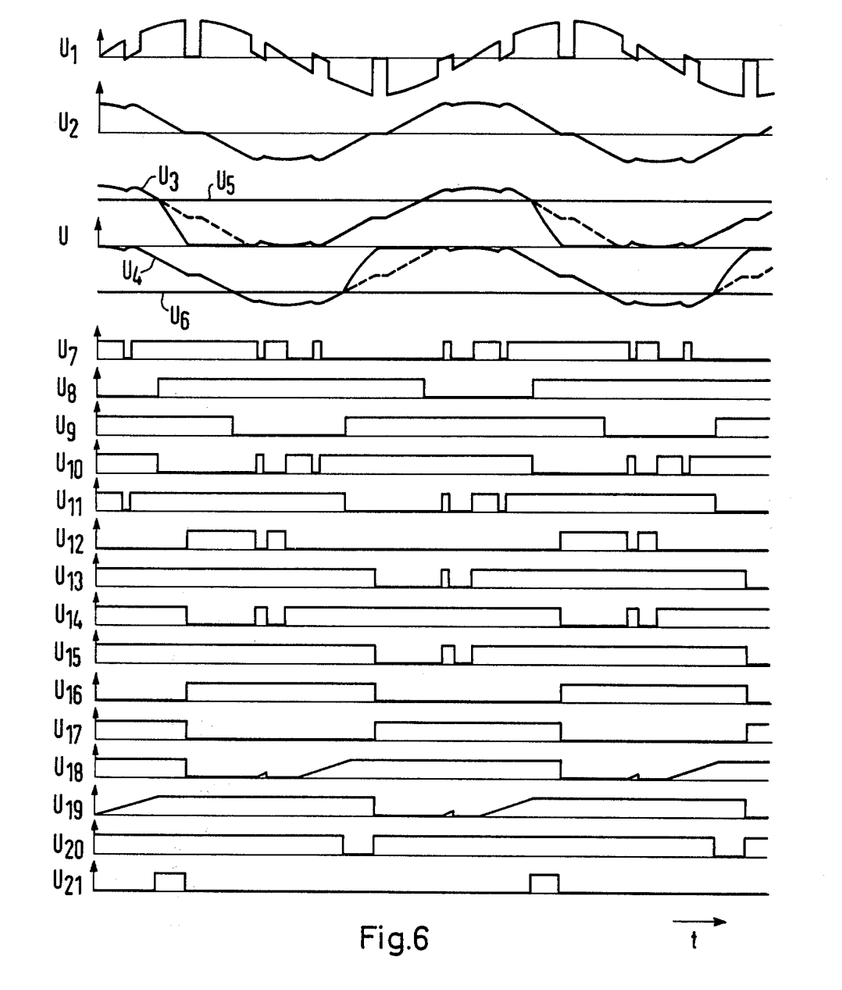
FIG. 6 is a similar wave-form diagram showing the effects of interference on the synchronizing wave-form.

FIG. 6 is a wave-form diagram similar to FIG. 5, showing the effects at various points in the circuit of commutation interference. Note the smoothing effect at the integrator has on the voltage $U_2$ and also the effect of the delay circuits as illustrated by the voltages $U_{18}$ and $U_{19}$.

Figure 7:
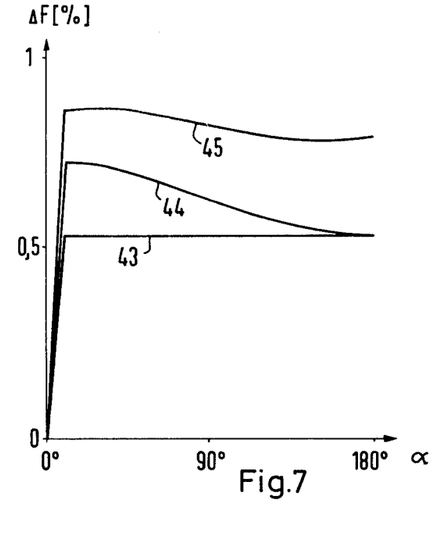
FIGS. 7 through 11 are curves illustrating the improved performance of the control system of the present invention in comparison with prior art systems.

As noted above the system of the present invention operates without disturbance in the presence of frequency changes, commutation interruptions, an harmonics on the synchronizing voltage. One manner of determining the accuracy of the system is from the asymmetry which occurs in the control pulses generated. A study has been made of the system of the present invention when operating in single phase AC control. The DC voltage component at the output of the control system resulting from asymmetry was in the example tested a maximum of plus and minus 0.43 percent of the mean value of a half period of the line voltage at the system input. The error components for nominal operation with sinusoidal voltage are shown on FIG. 5 as a function of control angle alpha. Curve 43 illustrates the error component due to the input zero voltage, curve 44 the error component due to the asymmetry of the control voltage resulting form the difference in the resistors 15 and 16, and curve 45 the error component caused by the discharge of the capacitors 7 and 9 through the inputs of the comparators 8 and 10 and the amplifiers 11b and 12 b. On the ordinate of FIG. 7 an error value Δ F is plotted which is obtained from the following relationship:

$$\Delta F = \left| \frac{|F1| - |F2|}{F_1 + F_3} \right|$$

where $F3 = \int_{t0}^{t1} \mu(t) \, dt$, etc.

Figure 7A:
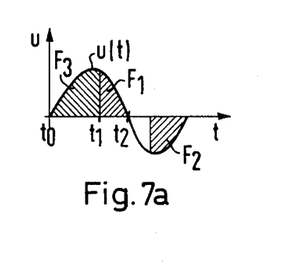

$F_1$, $F_2$ and $F_3$ denote the portions of the area which are indicated in FIG. 7a. In this Fig. the wave form $\mu$ [t] of the output voltage of the AC control element is shown.

Figure 8:
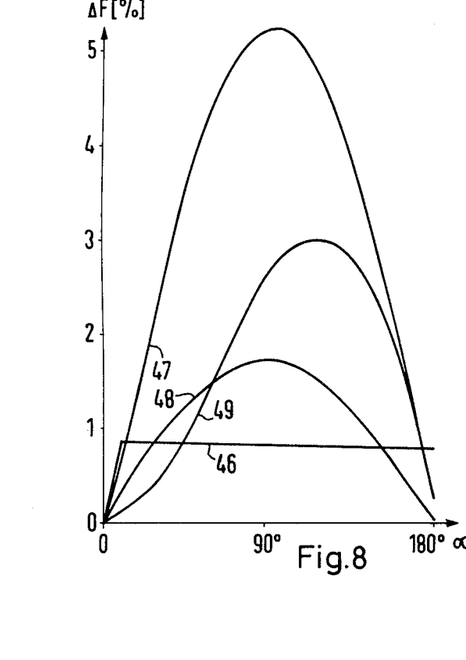
Figure 9:
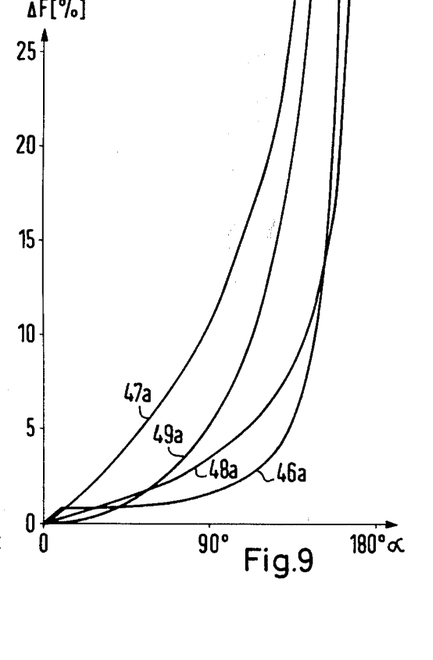

In FIG. 8 the asymmetries of different commercially available control systems are compared with that of the present invention. In these curves an undistorted sinusoidal synchronizing voltage is assumed. The curve 46 corresponds to the assymmetry of the control system of the present invention as illustrated in FIG. 4. Curve 47 shows the error of a control system with a constant control angle asymmetry of plus or minus 3°, el, curve 48 the asymmetry of a control system with a constant control angle asymmetry of plus or minus 1° el, and curve 49 an error for the control system with an asymmetry which is proportional to the control angle and which has a maximum of plus or minus 3° el. FIG. 9 illustrates for the same cases as in FIG. 8 the DC voltage component refered to the mean value of a half period of the output voltage of the control systems tested.

Figure 10:
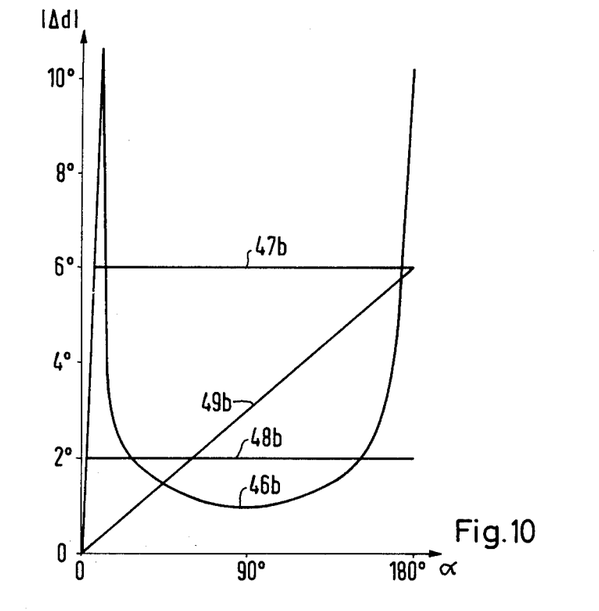

FIG. 10 shows the asymmetry of the control pulses at the beginning and the end of the control range for the four systems compared. The asymmetry of the control pulses as shown on curve 46b for the control system of the present invention appears large at the beginning and end of the control range. This, however, has no large effect on the voltage time area since as shown on FIG. 8 as asymmetry of, for example, 10° el results, within the control limits, in an error of only 0.85 percent in the control voltage. At the end of the control range [alpha approximately 180°] the output voltage is very small and the relative asymmetry is therefore large.

Figure 11:
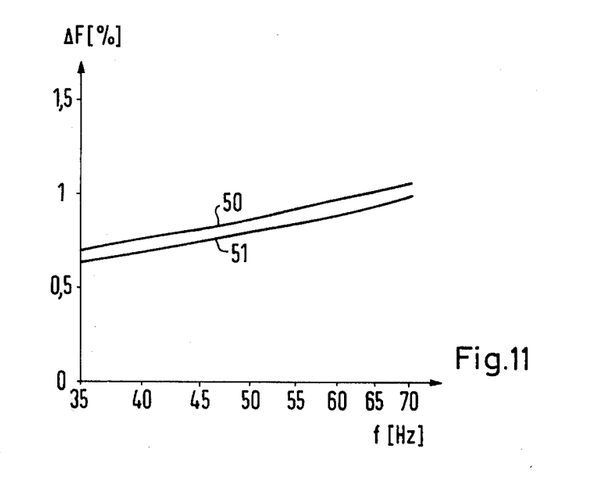

In a control system according to the present invention the asymmetry for a control angle of 0° is shown by the curve 50 and that for a control angle of 180° by the curve 51. The change of asymmetry takes place because of the change in the voltage time area which occurs with frequency change. Commutation interference decreases the voltage time areas. The relative area therefore becomes larger, but the absolute DC voltage component at the output of the control remains constant.

If the input voltage to the control system of the present invention is not purely sinusoidal but is a voltage distorted by commutation interference its operation is still superior to that of prior art systems. In RC filtered control systems of conventional design the pulse asymmetries are increased by the width of the commutation breaks and in the LC filtered control system by approximately half the width of a commutation break. In comparison, the control system of the present invention can be operated with a synchronizing voltage with commutation breaks of up to approximately 1 millisecond. Thus the control system of the present invention, with its voltage time area control is particularly advantageous for operation with distorted voltages and variable frequencies.

Thus an improved control system for externally control converters has been shown. Although specific embodiments have been illustrated and described, it will be obvious to those skilled in the art that various modifications may be made without departing from the spirit of the invention which is intended to be limited solely by the appended claims.

What is claimed is:

1. In a control system for an externally controlled converter controlled by means providing an alternating current synchronizing voltage the improvement comprising:
    a. a first input terminal for accepting the alternating current synchronizing voltage for said converter;
    b. a second input terminal for accepting a variable d.c. control voltage representative of the desired converter output;
    c. means coupled to said first terminal to develop a comparison voltage output which output is proportional to the voltage time area of synchronizing voltage; and
    d. a first comparator having as an input said comparison voltage output and coupled to said second terminal to obtain said d.c. control voltage as a second input, the output of said comparator being coupled to provide firing pulses to the converter.

2. The invention according to claim 1 wherein said means to develop a voltage proportional to the voltage-time area of the synchronizing voltage comprises an integrator having the synchronizing voltage as an input and providing its output to said comparator.

3. The invention according to claim 2 and further including potential decoupling means between the output of said integrator and said comparator, and a limiting stage at the input to said comparator adapted to limit the comparison voltage provided thereto to a predetermined value.

4. The invention according to claim 3 wherein said predetermined limiting value is zero.

5. Apparatus according to claim 3 and further including a second comparator having the output of said integrator as an input and means for inverting coupling said second input terminal to a second input of said second comparator and wherein said intergrator is scaled to provide positive and negative peak values equal to said predetermined limiting voltage.

6. The invention according to claim 5 and further including a circuit having the synchronizing voltage as an input and providing a pulse sequence output which is indicative of the polarity of the synchronizing voltage, and logic means having the output of said circuit and the outputs of said first and second comparators as inputs and combining said inputs to provide firing pulse outputs.

7. The invention according to claim 5 and further including first and second switching elements connected respectively to the comparison voltage inputs of said first and second comparators said first switch being adapted, when on, to provide a negative voltage to said first comparator and said second switch adapted, when on, to provide a positive voltage to said second comparator; and means for controlling said first and second switches such that said first switch in turned on in response to the comparison voltage in the first comparator falling below the DC reference voltage provided thereto and turned off in response to the limiter associated with said first comparator limiting the comparison voltage to said predetermined value and such that said second switch is turned on in response to the comparison voltage input to said second comparator rising above the DC reference voltage provided thereto and turned off in response to the limiter associated with said second comparator limiting said comparison voltage at said predetermined limiting voltage.

8. The invention according to claim 7 wherein said means for turning said first and second switches on and off comprises:
   a. a flip flop having as respective set and reset inputs the outputs of the limiting stages associated with said first and second comparators;
   b. a first gate having as inputs one output of said flip flop and the output of said first comparator and providing its output as a control input for said first switch; and
   c. a second gate having as inputs the other output of said flip flop and the output of said second comparator and providing its output as the control input to said second switch.

* * * * *